(12) United States Patent
Kooiman et al.

(10) Patent No.: US 11,059,561 B2
(45) Date of Patent: Jul. 13, 2021

(54) TORQUE BOX RIB AND METHOD FOR INSTALLATION THEREOF

(71) Applicant: Bell Helicopter Textron Inc., Fort Worth, TX (US)

(72) Inventors: James Everett Kooiman, Fort Worth, TX (US); David G. Carlson, North Richland Hills, TX (US); George Ryan Decker, Mansfield, TX (US); Jeffrey Matthew Williams, Hudson Oaks, TX (US); Douglas K. Wolfe, Denton, TX (US)

(73) Assignee: Textron Innovations Inc., Providence, RI (US)

( * ) Notice: Subject to any disclaimer, the term of this patent is extended or adjusted under 35 U.S.C. 154(b) by 717 days.

(21) Appl. No.: 15/870,977

(22) Filed: Jan. 14, 2018

(65) Prior Publication Data

US 2019/0217942 A1 Jul. 18, 2019

(51) Int. Cl.
*B64C 3/18* (2006.01)
*B64C 29/00* (2006.01)
*B64C 3/26* (2006.01)

(52) U.S. Cl.
CPC .............. *B64C 3/187* (2013.01); *B64C 3/26* (2013.01); *B64C 29/0033* (2013.01)

(58) Field of Classification Search
CPC ........... B64C 3/187; B64C 3/18; B64C 3/182; B64C 3/185
See application file for complete search history.

(56) References Cited

U.S. PATENT DOCUMENTS

| | | | | |
|---|---|---|---|---|
| 6,945,727 B2* | 9/2005 | Christman | ........ | B29C 66/43461 403/109.8 |
| 7,861,967 B2* | 1/2011 | Karem | ...................... | B64C 3/10 244/12.4 |
| 8,056,859 B2* | 11/2011 | Kunichi | ................... | B21J 15/14 244/123.1 |
| 8,104,714 B2* | 1/2012 | Brown | ...................... | B64C 1/26 244/123.8 |

OTHER PUBLICATIONS

Carlson, Dave; Wing Torque Box Bond Assembly of the BA 609; Presented at the American Helicopter Society 55th Annual Forum, Montreal, Quebec, Canada; May 25-27, 1999.

\* cited by examiner

*Primary Examiner* — Brian M O'Hara
(74) *Attorney, Agent, or Firm* — Lightfoot & Alford PLLC

(57) ABSTRACT

A torque box rib includes an upper rib cap configured to be coupled to an upper skin of a wing, a lower rib cap configured to be coupled to a lower skin of the wing, a forward post configured to be coupled to a forward spar of the wing, an aft post configured to be coupled to an aft spar of the wing, and a rib web configured to be coupled to the upper rib cap, the lower rib cap, the forward post, and the aft post.

20 Claims, 8 Drawing Sheets

TORQUE BOX RIB AND METHOD FOR INSTALLATION THEREOF

BACKGROUND

Tiltrotor aircraft generally include a fixed wing with a pair of tilting rotors coupled to opposite ends of the wing. The tilting rotors are rotatable between an airplane mode and a helicopter mode. As such, the wing of a tiltrotor aircraft experiences much larger torsional loads than a traditional fixed wing aircraft. Therefore, the wing of a tiltrotor aircraft includes a torque box designed to resist the high torsional load created by the tilting rotors. The torque box generally includes a forward spar, an aft spar, and a plurality of ribs.

There have been efforts to create a lightweight torque box utilizing a composite bonding procedure between the wing skins and the top and bottom portions of the ribs. A separate center portion was then mechanically fastened to the top and bottom portions. For example, "Wing Torque Box Bond Assembly of the BA 609," by Dave Carlson, incorporated herein by reference, discloses a method of bonding upper and lower rib portions that interdigitate with hat stringers along the wing skins. A corrugated center portion was then mechanically fastened to the upper and lower portions. This disclosure provides an improved torque box rib structure and method for installation thereof.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. In addition, the use of the term "coupled" throughout this disclosure may mean directly or indirectly connected, moreover, "coupled" may also mean permanently or removably connected, unless otherwise stated.

This disclosure provides a torque box rib and a method of installation thereof. The torque box rib may include five components: a forward post, an aft post, an upper rib cap, a lower rib cap, and a rib web. The forward post and the aft post are coupled to a forward spar and an aft spar, respectively. The upper rib cap and the lower rib cap are bonded to an upper wing skin and a lower wing skin, respectively. The rib web is bonded to the forward post, the aft post, the upper rib cap, and the lower rib cap such that any horizontal tolerance deviations may be absorbed by the joints between the rib web and the forward and aft posts and any vertical tolerance deviations may be absorbed by the joints between the rib web and the upper and lower rib caps.

Figure 1:
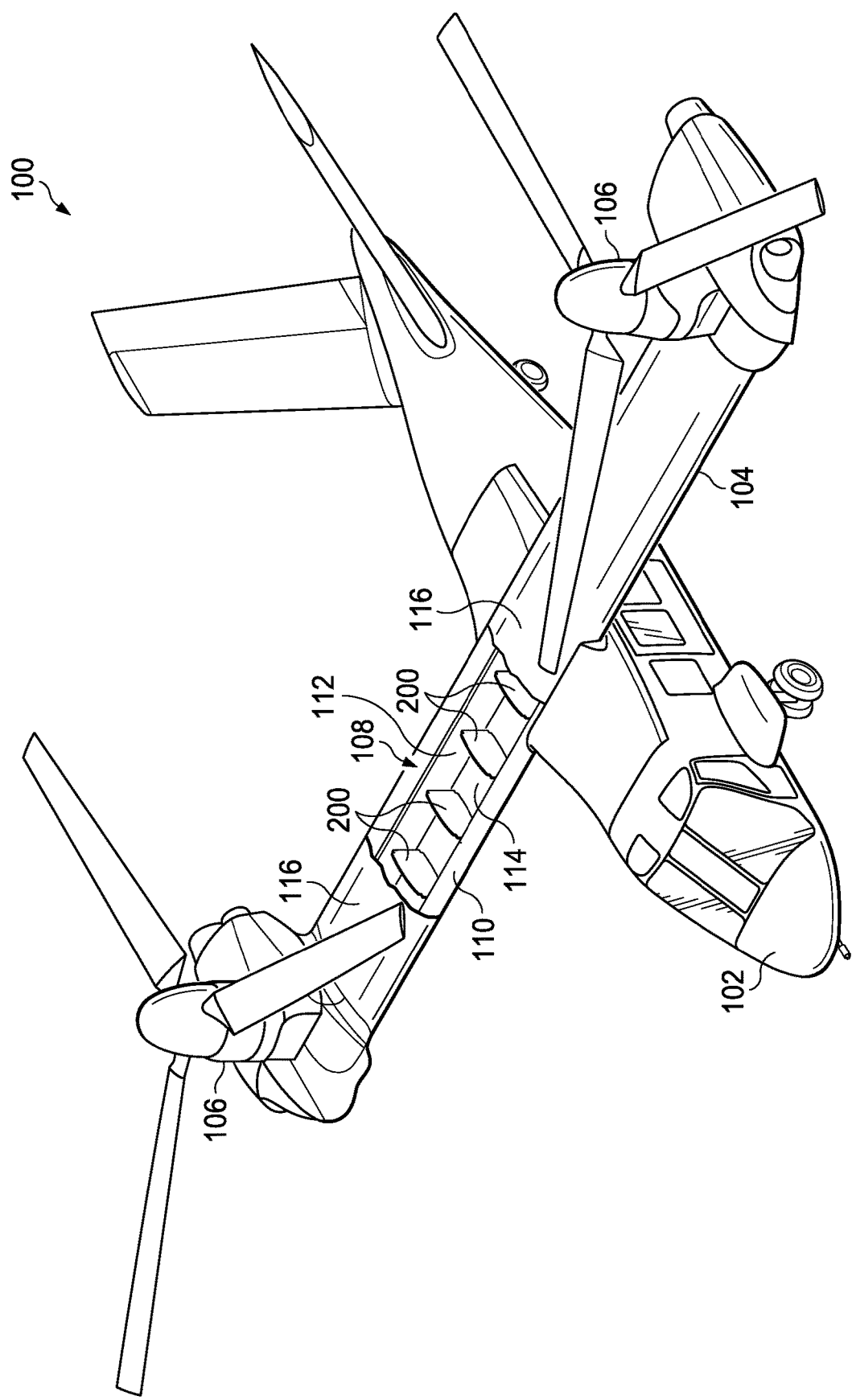
FIG. 1 is an oblique view of an aircraft including a torque box with torque box ribs, according to this disclosure.

FIG. 1 illustrates an aircraft 100 with a fuselage 102 and a wing 104 extending bilaterally from fuselage 102. Coupled to opposite ends of wing 104 are a pair of tilting rotors 106. Tilting rotors 106 are rotatable between a vertical, helicopter position, (as shown in FIG. 1) and a horizontal, airplane position. The varying forces transmitted from tilting rotors 106 through wing 104 to fuselage 102 requires a robust wing structure with a high degree of torsional stiffness. Accordingly, wing 104 includes a torque box 108 to help carry the loads. Torque box 108 includes a forward spar 110, an aft spar 112, a lower skin 114, an upper skin 116, and a plurality of ribs 200. Forward spar 110 is located proximate the front of wing 104 and aft spar 112 is located proximate the rear of wing 104, both forward spar 110 and aft spar 112 extend along the length of wing 104. Forward spar 110 and aft spar 112 may be made of a metal, such as aluminum or steel, or a composite material, such as carbon fiber or Kevlar, or any other material suitable for aircraft construction. Lower skin 114 covers the bottom half of wing 104 and upper skin 116 covers the top half of wing 104. Lower skin 114 and upper skin 116 are preferably made of a composite material such as, carbon fiber or Kevlar, but may be made of any other suitable material. Ribs 200 are shown in FIGS. 2-4 and described below.

Figure 2:
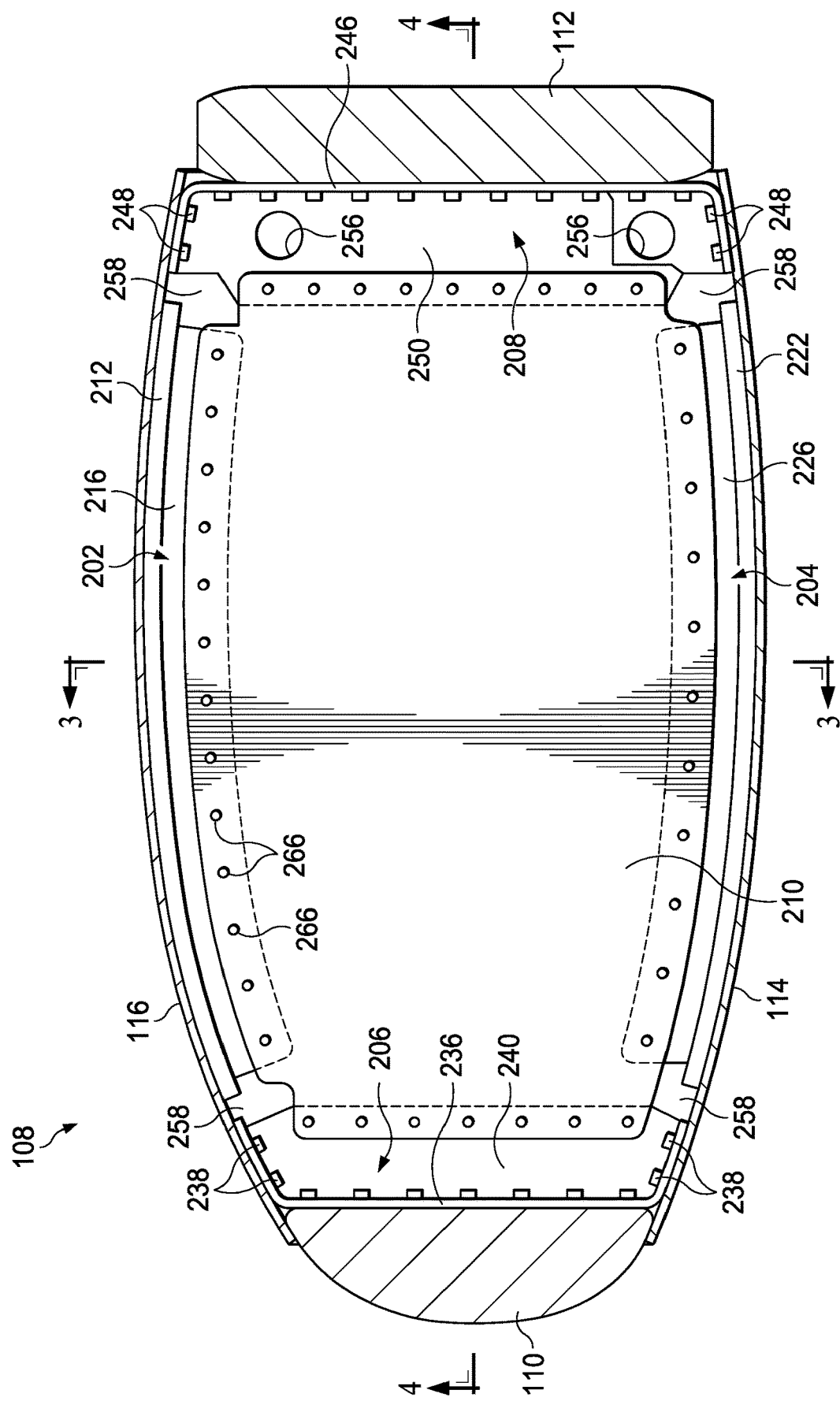
FIG. 2 is cross-sectional side view of the torque box and the torque box rib of FIG. 1.
Figure 3A:
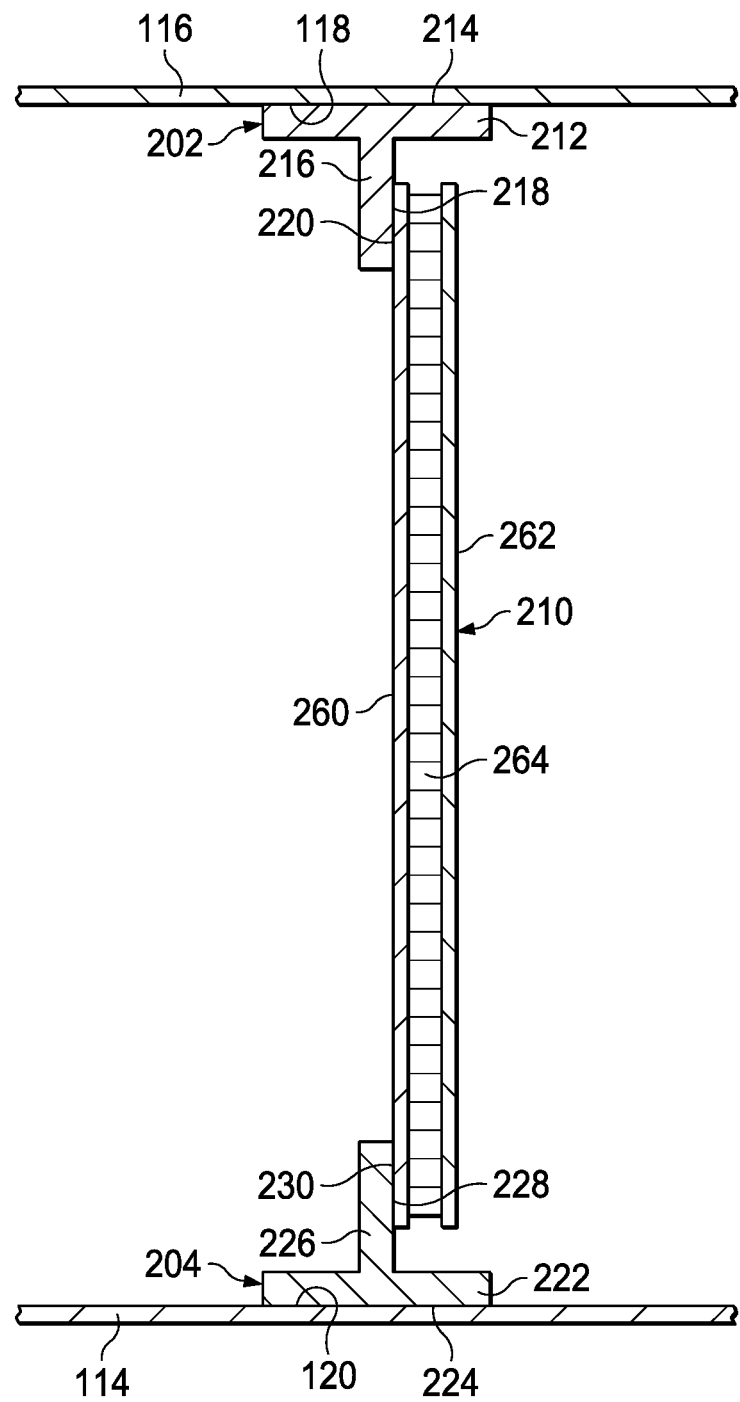
FIG. 3A is a cross-sectional front view of the torque box and the torque box rib of FIG. 1.
Figure 3B:
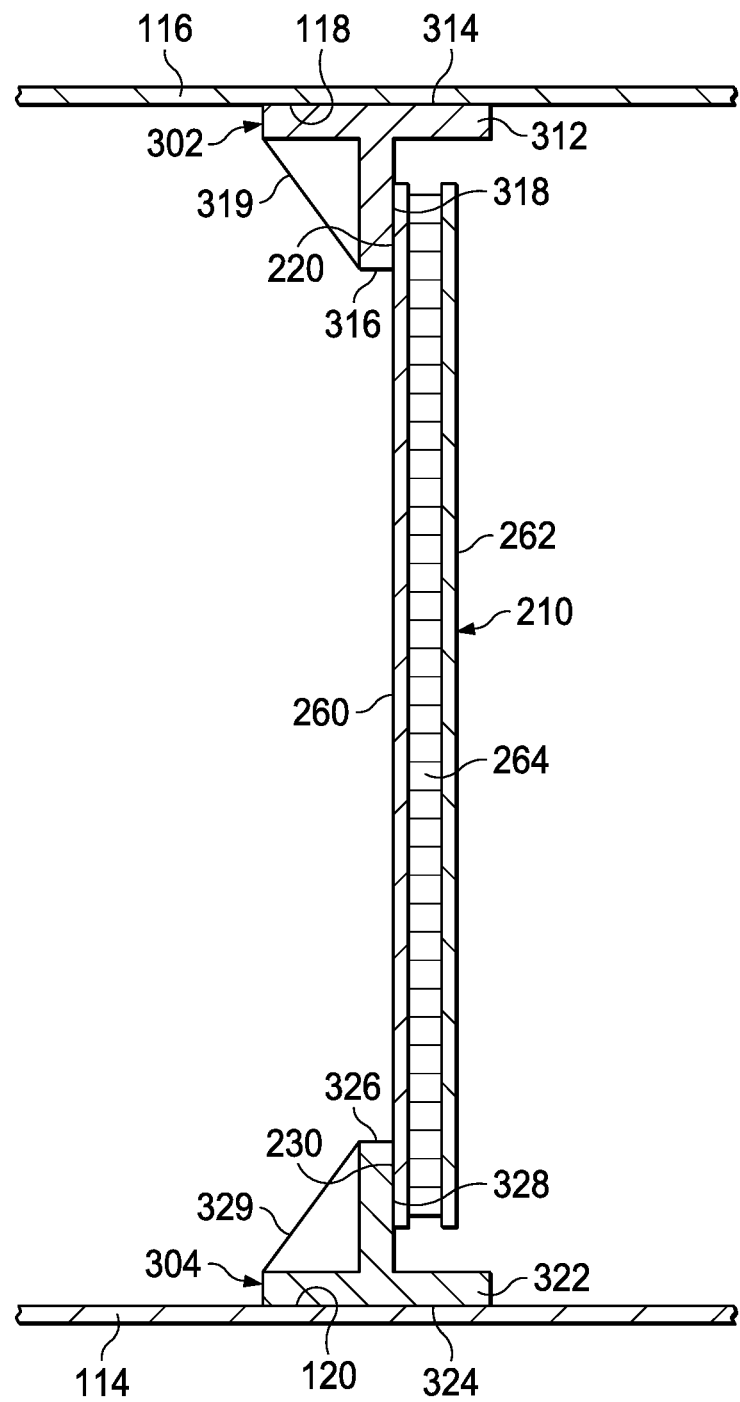
FIG. 3B is a cross-sectional front view of the torque box and an alternative torque box rib.
Figure 3C:
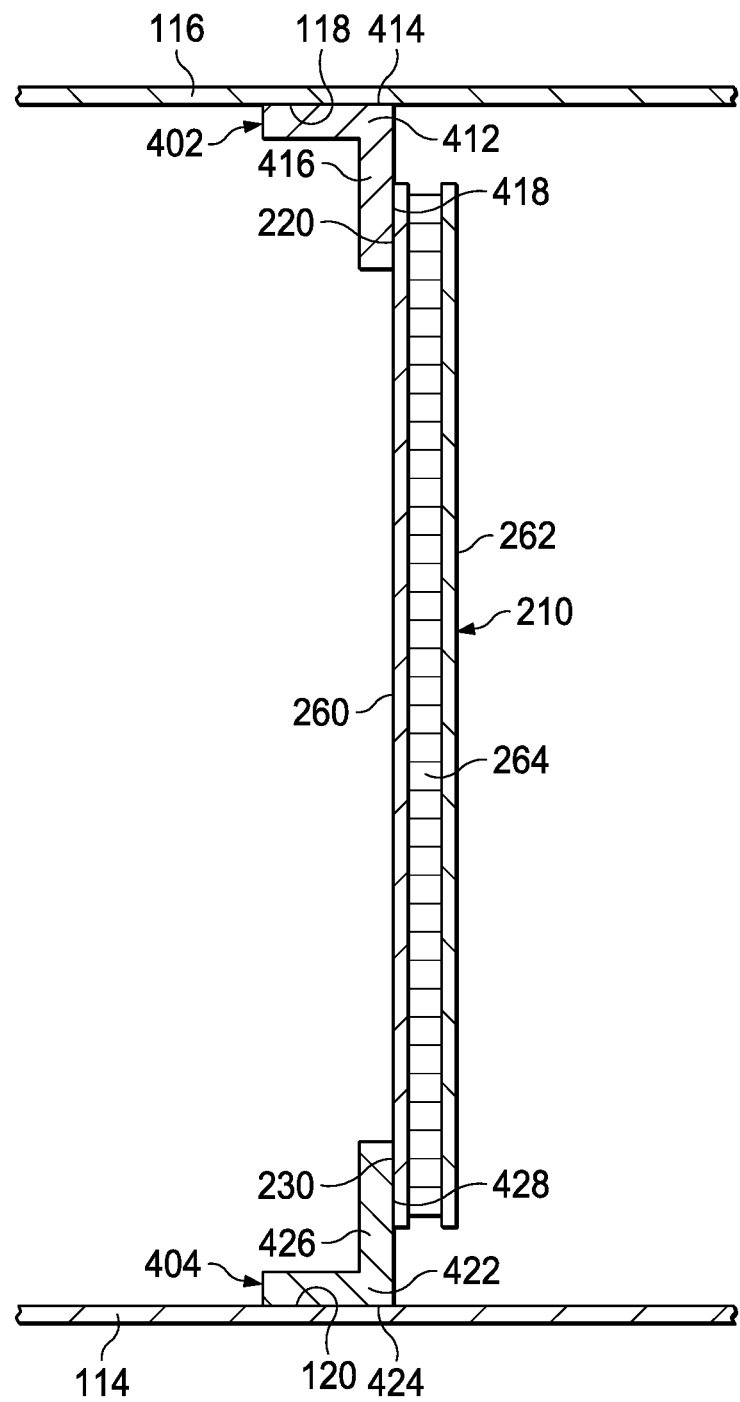
FIG. 3C is a cross-sectional front view of the torque box and an alternative torque box rib.
Figure 3D:
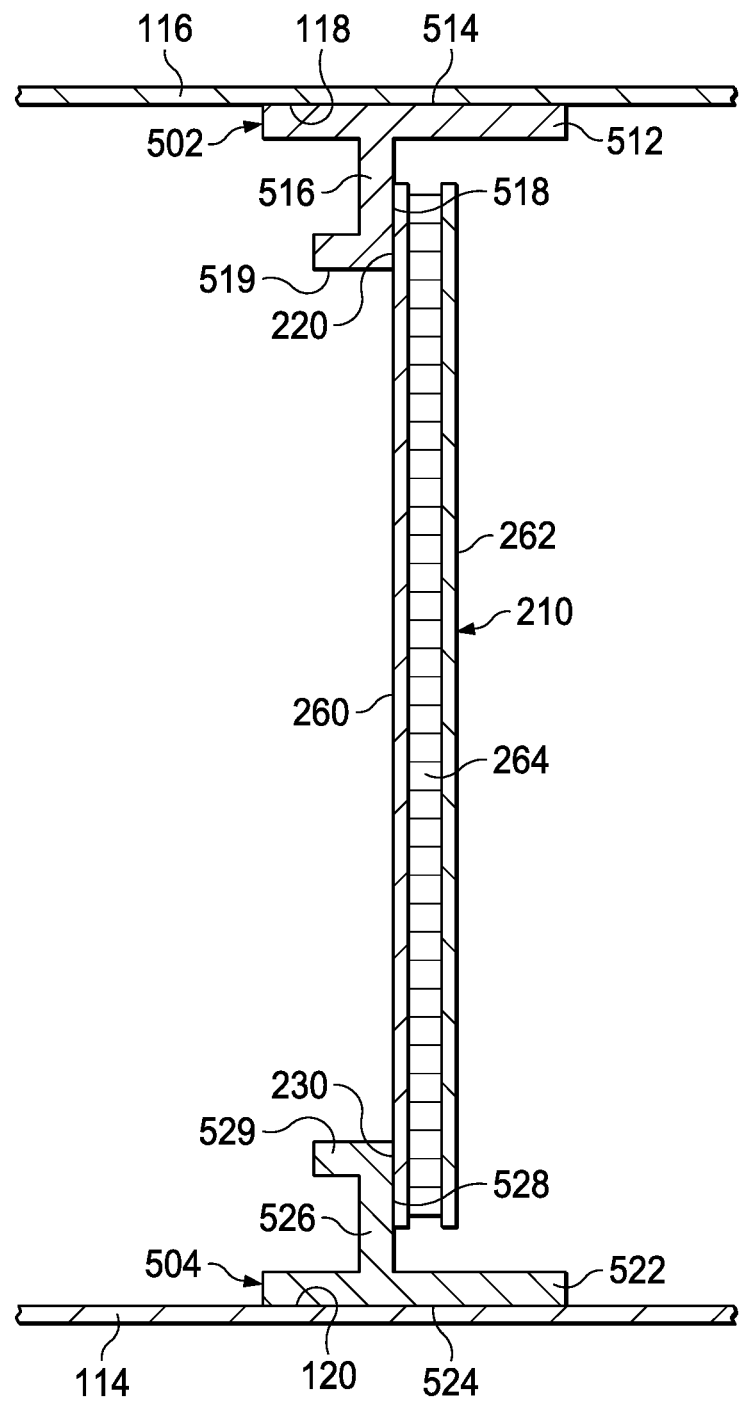
FIG. 3D is a cross-sectional front view of the torque box and an alternative torque box rib.
Figure 3E:
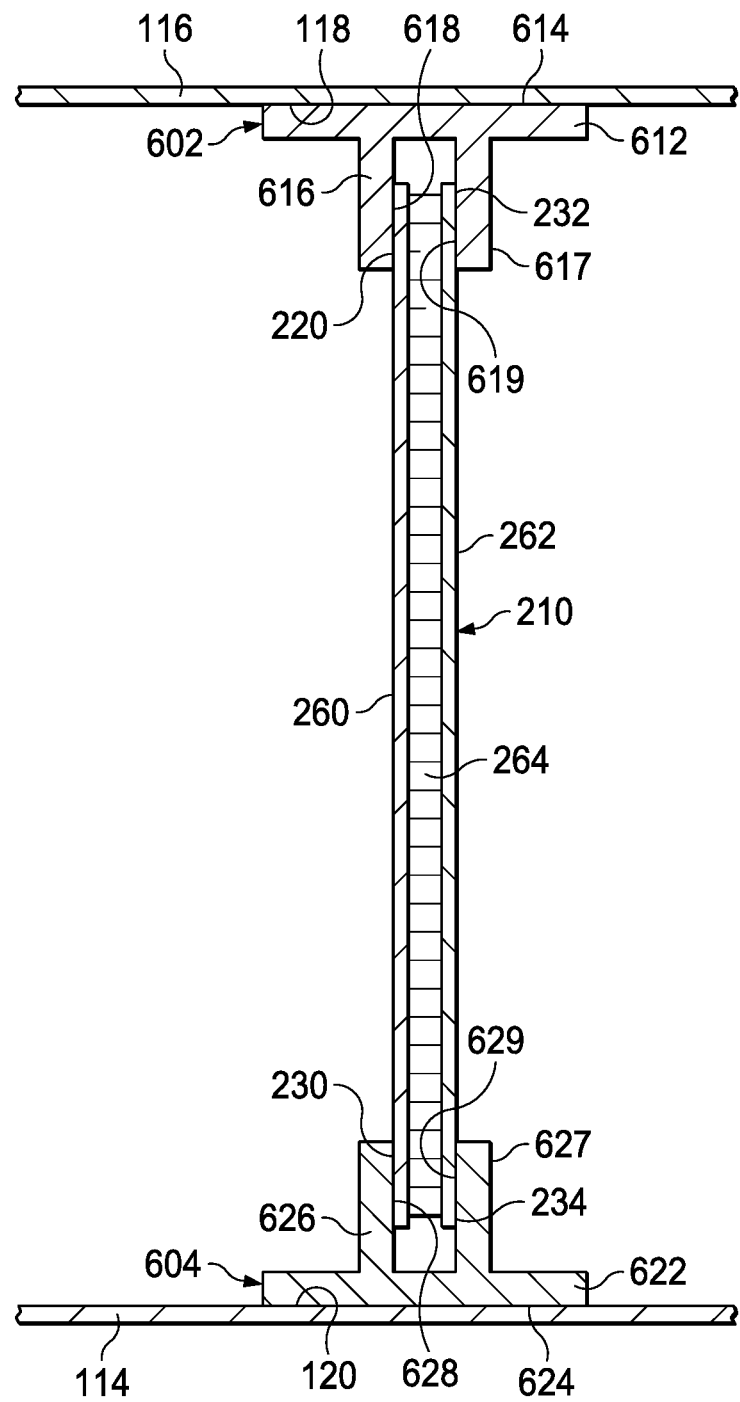
FIG. 3E is a cross-sectional front view of the torque box and an alternative torque box rib.
Figure 4:
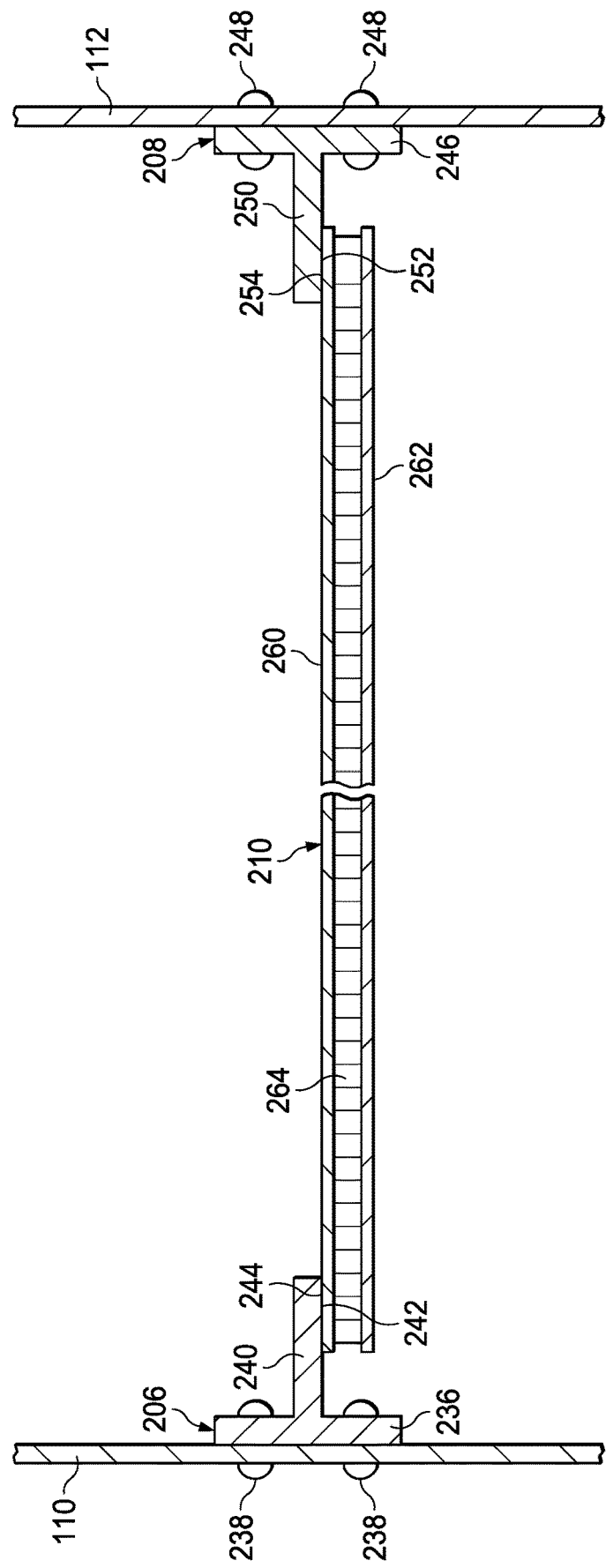
FIG. 4 is a cross-sectional top view of the torque box and the torque box rib of FIG. 1.

FIGS. 2-4 illustrate portions of torque box 108 and rib 200. Rib 200 includes an upper rib cap 202, a lower rib cap 204, a forward post 206, an aft post 208, and a rib web 210, all of which are preferably made of composite materials, such as carbon fiber or Kevlar, but may be made of other suitable materials, such as lightweight metals. As best shown in FIG. 3A, upper rib cap 202 includes a base 212 with an upper skin bonding surface 214 configured to be bonded to an interior surface 118 of upper skin 116. Upper skin bonding surface 214 may be curved along an uninterrupted majority of a length thereof. The shape of upper skin bonding surface 214 preferably compliments the shape of interior surface 118 of upper skin 116, such that a bond line between upper skin bonding surface 214 and interior surface 118 does not have any gaps. As shown, upper skin bonding surface 214 and interior surface 118 may have complimentary curvatures that correspond to the airfoil shape of upper skin 116. An upright 216 extends orthogonally from base 212 to facilitate attachment of rib web 210. Upright 216 includes a rib web bonding surface 218 configured to be bonded to an upper rib cap bonding surface 220 of rib web 210 to upper rib cap 202. Both rib web bonding surface 218 of upper rib cap 202 and upper rib cap bonding surface 220 of rib web 210 are preferably flat surfaces so as to permit relative movement therebetween prior to bonding. After bonding, a bonded joint formed therebetween has a flat, uninterrupted, bond line along a majority of a length of the bonded joint.

Similar to upper rib cap 202, lower rib cap 204 includes a base 222 with a lower skin bonding surface 224 configured to be bonded to an interior surface 120 of lower skin 114. Lower skin bonding surface 224 may be curved along an uninterrupted majority of a length thereof. The shape of lower skin bonding surface 224 preferably compliments the shape of interior surface 120 of lower skin 114, such that a bond line between lower skin bonding surface 224 and interior surface 120 does not have any gaps. An upright 226 extends orthogonally from base 222 to facilitate attachment of rib web 210 to lower rib cap 204. Upright 226 includes a rib web bonding surface 228 configured to be bonded to a lower rib cap bonding surface 230 of rib web 210. Both rib web bonding surface 228 of lower rib cap 204 and lower rib cap bonding surface 230 or rib web 210 are preferably flat surfaces so as to permit relative movement therebetween prior to bonding. After bonding, a bonded joint formed therebetween has a flat, uninterrupted, bond line along a majority of a length of the bonded joint.

As shown in FIGS. 3B-3E, several alternative rib caps are illustrated. The rib caps shown in FIGS. 3B-3E may be used to replace upper rib cap 202 and lower rib cap 204 on rib 200. As shown in FIG. 3B, an upper rib cap 302 includes a base 312 with an upper skin contact surface 314 configured to be bonded to interior surface 118 of upper skin 116. An upright 316 extends orthogonally from base 312 to facilitate attachment of rib web 210 to upper rib cap 302. Upright 316 includes a rib web contact surface 318 configured to be bonded to upper rib cap bonding surface 220 of rib web 210. Upper rib cap 302 further includes a buttress 319 that provides additional support between base 312 and upright 316.

Similar to upper rib cap 302, a lower rib cap 304 includes a base 322 with a lower skin contact surface 324 configured to be bonded to interior surface 120 of lower skin 114. An upright 326 extends orthogonally from base 322 to facilitate attachment of rib web 210. Upright 326 includes a rib web contact surface 328 configured to be bonded to lower rib cap bonding surface 230 of rib web 210. Lower rib cap 304 further includes a buttress 329 that provides additional support between base 322 and upright 326.

As shown in FIG. 3C, an upper rib cap 402 includes a base 412 with an upper skin contact surface 414 configured to be bonded to interior surface 118 of upper skin 116. An upright 416 extends orthogonally from base 412 to facilitate attachment of rib web 210 to upper rib cap 402. Upright 416 includes a rib web contact surface 418 configured to be bonded to upper rib cap bonding surface 220 of rib web 210.

Similar to upper rib cap 402, a lower rib cap 404 includes a base 422 with a lower skin contact surface 424 configured to be bonded to interior surface 120 of lower skin 114. An upright 426 extends orthogonally from base 422 to facilitate attachment of rib web 210 to lower rib cap 404. Upright 426 includes a rib web contact surface 428 configured to be bonded to lower rib cap bonding surface 230 of rib web 210.

As shown in FIG. 3D, an upper rib cap 502 includes a base 512 with an upper skin contact surface 514 configured to be bonded to interior surface 118 of upper skin 116. An upright 516 extends orthogonally from base 512 to facilitate attachment of rib web 210 to upper rib cap 502. Upright 516 includes a rib web contact surface 518 configured to be bonded to upper rib cap bonding surface 220 of rib web 210. Upper rib cap 502 further includes a buttress 519 extending orthogonally from upright 516 that provides additional stiffness to upright 516.

Similar to upper rib cap 502, a lower rib cap 504 includes a base 522 with a lower skin contact surface 524 configured to be bonded to interior surface 120 of lower skin 114. An upright 526 extends orthogonally from base 522 to facilitate attachment of rib web 210 to lower rib cap 504. Upright 526 includes a rib web contact surface 528 configured to be bonded to lower rib cap bonding surface 230 of rib web 210. Lower rib cap 504 further includes a buttress 529 extending orthogonally from upright 526 that provides additional stiffness to upright 526.

As shown in FIG. 3E, an upper rib cap 602 includes a base 612 with an upper skin contact surface 614 configured to be bonded to interior surface 118 of upper skin 116. A first upright 616 and a second upright 617 extend orthogonally from base 612 to facilitate attachment of rib web 210 to upper rib cap 602. First upright 616 includes a rib web contact surface 618 configured to be bonded to upper rib cap bonding surface 220 of rib web 210. Second upright 617 includes a rib web contact surface 619 configured to be bonded to a second upper rib cap bonding surface 232 of rib web 210.

Similar to upper rib cap 602, a lower rib cap 604 includes a base 622 with a lower skin contact surface 624 configured to be bonded to interior surface 120 of lower skin 114. A first upright 626 and a second upright 627 extend orthogonally from base 622 to facilitate attachment of rib web 210 to lower rib cap 604. First upright 626 includes a rib web contact surface 628 configured to be bonded to lower rib cap bonding surface 230 of rib web 210. Second upright 627 includes a rib web contact surface 629 configured to be bonded to a second lower rib cap bonding surface 234 of rib web 210.

As shown in FIGS. 2 and 4, forward post 206 includes a foot 236 configured to be coupled to forward spar 110, upper skin 116, and lower skin 114. Foot 236 is shown as being mechanically fastened to forward spar 110, upper skin 116, and lower skin 114 using rivets 238. However, foot 236 may be mechanically fastened using any suitable means, such as screws or bolts. In addition, foot 236 may be bonded to forward spar 110, upper skin 116, and lower skin 114 instead of, or in addition to, mechanical fastening. A panel 240 extends orthogonally from foot 236 to facilitate attachment of rib web 210 to forward post 206. Panel 240 includes a rib web contact surface 242 configured to be bonded to a forward post bonding surface 244 of rib web 210. Both rib web contact surface 242 of forward post 206 and forward post bonding surface 244 of rib web 210 are preferably flat surfaces so as to permit relative movement therebetween prior to bonding. After bonding, a bonded joint formed therebetween has a flat, uninterrupted, bond line along a majority of a length of the bonded joint.

Similar to forward post 206, aft post 208 includes a foot 246 configured to be coupled to aft spar 112, upper skin 116, and lower skin 114. Foot 246 is shown as being mechanically fastened to aft spar 112, upper skin 116, and lower skin 114 using rivets 248. However, foot 246 may be mechanically fastened using any suitable means, such as screws or bolts. In addition, foot 246 may be bonded to aft spar 112, upper skin 116, and lower skin 114 instead of, or in addition to, mechanical fastening. A panel 250 extends orthogonally from foot 246 to facilitate attachment of rib web 210. Panel 250 includes a rib web bonding surface 252 configured to be bonded to an aft post bonding surface 254 of rib web 210. Both rib web bonding surface 252 of aft post 208 and aft post bonding surface 254 of rib web 210 are preferably flat surfaces so as to permit relative movement therebetween prior to bonding. After bonding, a bonded joint formed therebetween has a flat, uninterrupted, bond line along a majority of a length of the bonded joint. Aft post 208 also includes apertures 256 extending therethrough. Apertures 256 are provided for routing of electrical or mechanical equipment internally through wing 104. Apertures 256 may be formed in aft post 208 or created after assembly of rib 200 by drilling or reaming. While apertures 256 are shown in aft post 208, they may be located in forward post 206, upper rib cap 202, lower rib cap 204, or rib web 210, or they may be omitted in favor of routing equipment through gaps 258 between the components of rib 200 proximate the corners of thereof.

While forward post 206 and aft post 208 are only shown having a T-shaped cross-section, it should be understood that forward post 206 and aft post 208 may have any of the cross-section shapes of the various embodiments of rib caps disclosed herein. Moreover, the rib caps and posts may have any cross-sectional shape suitable for their purpose without deviating from this disclosure.

As shown in FIGS. 3-4, rib web 210 is preferably a sandwich panel including a first face 260, a second face 262, and a core 264 bonded therebetween. First face 260 and second face 262 preferably are made of sheets of carbon fiber or Kevlar, but may be made of any other suitable material. Core 264 is preferably a carbon fiber or nomex honeycomb structure, however, core 264 may comprise foam or corrugation, or any other suitable sandwich panel core.

Assembling torque box 108 includes preparing interior surface 118 of upper skin 116, interior surface 120 of lower skin 114, upper skin bonding surface 214, rib web bonding surface 218, upper rib cap bonding surface 220, lower skin bonding surface 224, lower rib web bonding surface 228, lower rib cap bonding surface 230, rib web contact surface 242, forward post bonding surface 244, rib web bonding surface 252, and aft post bonding surface 254 by either grit blasting or sanding and solvent wiping the surfaces. Bonding of the surfaces may be accomplished with a film or liquid adhesive applied between the surfaces and then applying a clamping force and either allowing ambient temperature bonding or heat curing. Because the structure may be too large to cure in an oven, localized convection heaters may be used to apply heat at each joint. After allowing the joints to fully cure, each joint should be inspected. If the quality of the bond is insufficient, the joints may be supplemented with mechanical fasteners. For example, as shown in FIG. 2, optional rivets 266 may be inserted to add additional strength to the joints. Bonding, as disclosed in this specification and used in the claims appended hereto, should be understood to include adhesive bonding, co-curing, co-bonding, induction welding, or any other manner of joining components together without requiring mechanical fasteners. However, it should be understood that bonding is not required. Any joints created in assembling rib 200 may be bonded, mechanically fastened, or both.

Preferably, torque box 108 is assembled by first coupling lower skin 114 and upper skin 116 to forward spar 110 and aft spar 112. At this point, lower skin 114 includes openings adjacent to each desired rib 200 location that permit a technician to access the inside of wing 104 to perform the construction of ribs 200 within wing 104. Next, forward post 206 is coupled to forward spar 110, upper skin 116, and lower skin 114, and aft post 208 is coupled to aft spar 112, upper skin 116, and lower skin 114. Then, lower rib cap 204 is coupled to lower skin 114, and upper rib cap 202 is coupled to upper skin 116. Finally, rib web 210 is coupled to forward post 206, aft post 208, upper rib cap 202, and lower rib cap 204. The fact that rib web 210 is a separate component from forward post 206, aft post 208, upper rib cap 202, and lower rib cap 204 allows it to be moved vertically and horizontally before it is bonded in place. Coupling rib web 210 in place last, and allowing for some movement of rib web 210 relative to the other components enables the technician to float out any tolerance issues created throughout construction of wing 104. However, this order is not required; torque box 108 may be assembled in any order. For example, for ease of access, it may be preferred to couple upper skin 116 in place as the last step. If this is the case, lower skin 114 would be attached first, then lower rib cap 204, then forward post 206 and aft post 208, followed by rib web 210. Upper rib cap 202 would be attached to rib web 210 utilizing tooling that mimics that location of upper skin 116. And finally, torque box 108 would be completed by attaching upper skin 116.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, RI, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:
1. A torque box rib, comprising:
an upper rib cap configured to be coupled to an upper skin of a wing;
a lower rib cap configured to be coupled to a lower skin of the wing;
a forward post configured to be coupled to a forward spar of the wing;
an aft post configured to be coupled to an aft spar of the wing; and
a rib web configured to be coupled to the upper rib cap, the lower rib cap, the forward post and the aft post;

wherein the forward spar comprises a forward profile that forms a portion of an aerodynamic shape of a leading edge of the wing.

2. The torque box rib of claim 1, wherein the upper rib cap, the lower rib cap, the forward post, the aft post, and the rib web are made of composite materials.

3. The torque box rib of claim 2, wherein the upper rib cap and the lower rib cap are configured to be coupled to the upper skin and lower skin of the wing, respectively, via bonding.

4. The torque box rib of claim 3, wherein the rib web is configured to be coupled to the upper rib cap, the lower rib cap, the forward post, and the aft post via bonding.

5. The torque box rib of claim 4, wherein the rib web comprises a sandwich panel.

6. The torque box rib of claim 5, wherein the upper rib cap includes an upper skin bonding surface that is curved along an uninterrupted majority of a length of the upper skin bonding surface, the upper skin bonding surface being configured to compliment a curvature of an interior surface of the upper skin of the wing, and the lower rib cap includes a lower skin bonding surface that is curved along an uninterrupted majority of a length of the lower skin bonding surface, the lower skin bonding surface being configured to compliment a curvature of an interior surface of the lower skin of the wing.

7. The torque box rib of claim 6, wherein the rib web is configured to have bonded joints with each of the upper rib cap, the lower rib cap, the forward post, and the aft post, wherein each of the bonded joints between the rib web and the upper rib cap, the lower rib cap, the forward post, and the aft post are uninterrupted along a majority of a length of each respective bonded joint.

8. The torque box rib of claim 7, wherein the forward post and the aft post are both configured to be coupled to the upper skin and the lower skin.

9. A method of fabricating a torque box, comprising:
coupling a forward post to a forward spar;
coupling an aft post to an aft spar;
coupling a lower skin to the forward spar and the aft spar;
coupling an upper skin to the forward spar and the aft spar;
coupling a lower rib cap to the lower skin;
coupling an upper rib cap to the upper skin; and
coupling a rib web to the forward post, the aft post, the lower rib cap, and the upper rib cap;
wherein the forward spar comprises a forward profile that forms a portion of an aerodynamic shape of a leading edge of the wing.

10. The method of claim 9, wherein the coupling of the lower rib cap to the lower skin and the coupling of the upper rib cap to the upper skin both comprise bonding.

11. The method of claim 10, wherein the coupling of the rib web to the forward post, the aft post, the lower rib cap, and the upper rib cap comprise bonding.

12. The method of claim 11, further comprising:
coupling the forward post to the upper skin and the lower skin; and
coupling the aft post to the upper skin and the lower skin.

13. The method of claim 12, wherein the coupling of the forward post to the forward spar and the coupling of the aft post to the aft spar comprise mechanical fastening.

14. An aircraft, comprising:
a fuselage; and
a wing extending from the fuselage, the wing comprising:
a forward spar;
an aft spar;
a lower skin;
an upper skin; and
a rib, comprising:
an upper rib cap coupled to the upper skin of the wing;
a lower rib cap coupled to the lower skin of the wing;
a forward post coupled to the forward spar of the wing;
an aft post coupled to the aft spar of the wing; and
a rib web coupled to the upper rib cap, the lower rib cap, the forward post, and the aft post;
wherein the forward spar comprises a forward profile that forms a portion of an aerodynamic shape of a leading edge of the wing.

15. The aircraft of claim 14, wherein the lower skin, the upper skin, and the rib comprise composite materials.

16. The aircraft of claim 15, wherein the forward post and the aft post are both coupled to the upper skin and the lower skin.

17. The aircraft of claim 16, wherein the upper rib cap is coupled to the upper skin with an upper bonded joint, the upper bonded joint having an uninterrupted curvature along a majority of a length of thereof, and the lower rib cap is coupled to the lower skin with a lower bonded joint, the lower bonded joint having an uninterrupted curvature along a majority of the length of thereof.

18. The aircraft of claim 17, wherein the rib web comprises a sandwich panel.

19. The aircraft of claim 18, wherein the rib web is coupled to the upper rib cap, the lower rib cap, the forward post, and the aft post with four bonded joints, each bonded joint having a substantially flat, uninterrupted, bond line along a majority of the length of the joint.

20. The aircraft of claim 19, further comprising a pair of tilting rotors coupled to the wing.

* * * * *